United States Patent [19]
Frederick et al.

[11] Patent Number: 6,072,921
[45] Date of Patent: Jun. 6, 2000

[54] METHOD OF OPERATING A FIBER-OPTIC ACOUSTICAL SENSOR, APPARATUS FOR PRACTICING THE METHOD, AND IN-LINE FIBER-OPTIC POLARIZER USABLE IN SUCH APPARATUS

[75] Inventors: Donald Adam Frederick, Woodland Hills; David Barnett Hall, La Crescenta, both of Calif.

[73] Assignee: Litton Systems, Inc., Woodland Hills, Calif.

[21] Appl. No.: 08/896,433

[22] Filed: Jul. 18, 1997

[51] Int. Cl.[7] ........................................ H04R 3/04
[52] U.S. Cl. ................ 385/12; 385/11; 367/140; 367/141
[58] Field of Search ............... 367/64, 130, 140, 367/141, 149, 153; 385/7, 12, 11

[56] References Cited

U.S. PATENT DOCUMENTS

| | | | |
|---|---|---|---|
| 3,667,038 | 5/1972 | Cutler et al. | 324/77 R |
| 3,740,117 | 6/1973 | Hubby, Jr. | 350/149 |
| 4,238,856 | 12/1980 | Bucaro et al. | 455/614 |
| 4,529,312 | 7/1985 | Pavlath et al. | 356/350 |
| 4,572,949 | 2/1986 | Bowers et al. | 250/227 |
| 4,652,744 | 3/1987 | Bowers et al. | 250/227 |
| 4,666,235 | 5/1987 | Pavlath | 350/96.15 |
| 4,666,255 | 5/1987 | Taylor et al. | 350/371 |
| 4,712,866 | 12/1987 | Dyott | 350/96.3 |
| 4,729,622 | 3/1988 | Pavlath | 350/96.15 |
| 4,787,741 | 11/1988 | Udd et al. | 356/35.5 |
| 4,795,233 | 1/1989 | Chang | 350/96.29 |
| 4,848,906 | 7/1989 | Layton | 356/345 |
| 4,852,959 | 8/1989 | Werner et al. | 350/96.18 |
| 4,882,716 | 11/1989 | Lefevre et al. | 367/149 |
| 4,944,571 | 7/1990 | Rogers | 350/96.29 |
| 5,039,221 | 8/1991 | Layton et al. | 356/345 |
| 5,042,896 | 8/1991 | Dahlgren | 385/31 |
| 5,051,965 | 9/1991 | Poorman | 367/149 |
| 5,054,922 | 10/1991 | Kersey | 356/345 |
| 5,206,924 | 4/1993 | Kersey | 385/24 |
| 5,517,303 | 5/1996 | Cole et al. | 356/345 |

*Primary Examiner*—John D. Lee
*Assistant Examiner*—Juliana K. Kang
*Attorney, Agent, or Firm*—Terry L. Miller

[57] ABSTRACT

A fiber-optic acoustical sensor system includes a light source, an elongate optical cable conducting light from the light source to an optical acoustical transducer located at a distance from the light source along this cable, and a polarizer at the acoustical transducer. The sensor system includes a polarizer providing orthogonally-polarized light along the optical cable to the polarizer located adjacent to the transducer. Because of the polarizer adjacent to the transducer, disturbances of the optical cable and resulting polarization perturbations of the light transmitted along this cable do not affect the optical acoustical transducer. The acoustic transducer is responsive to sound energy to provide an optical return signal indicative of this sound energy. An in-line fiber-optic polarizer suitable for use in this acoustical transducer includes a pair of confronting optical fiber portions aligned along an optical axis and which each define end surfaces disposed at a Brewster polarizer angle with respect to light transmitted along this optical axis. The end surface of one of these optical fibers carries plural alternating sub-layers of high-index and low-index dielectric material, which are effective to p-polarize the transmitted light and substantially eliminate s-polarized light transmission to the optical acoustical transducer.

18 Claims, 6 Drawing Sheets

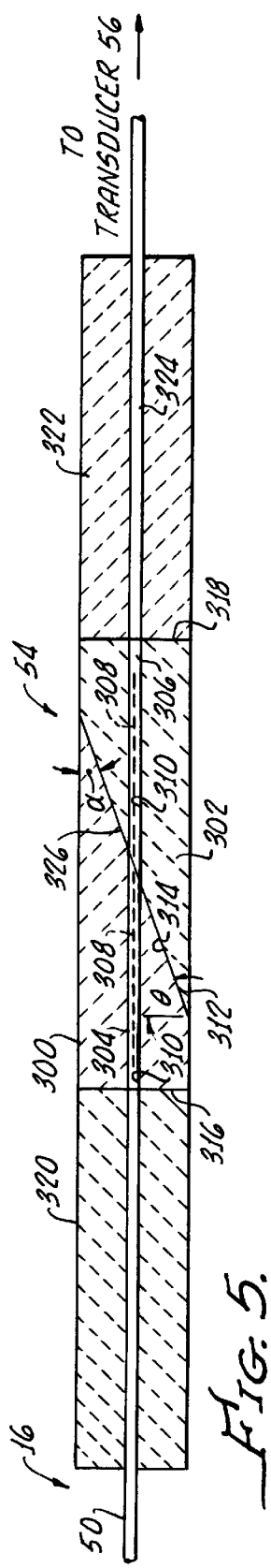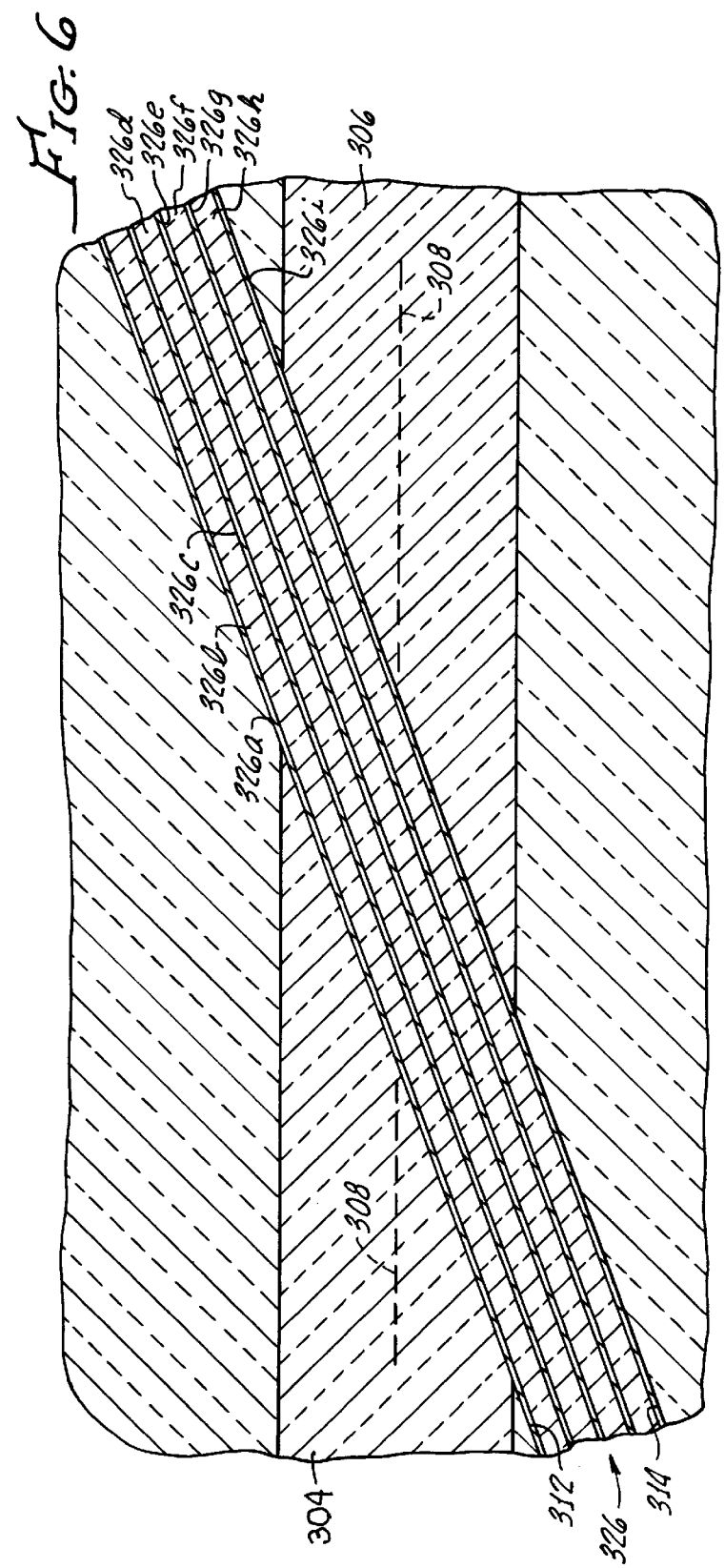

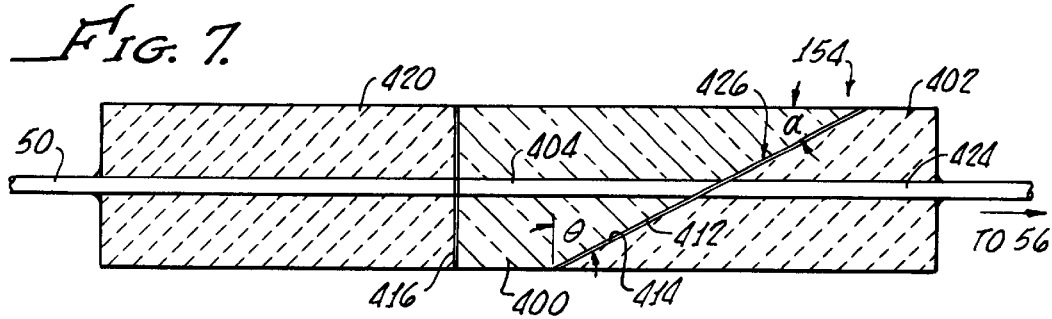
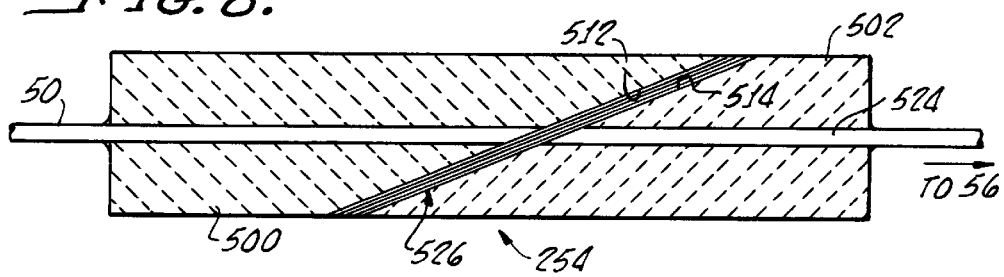
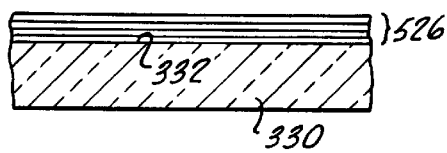
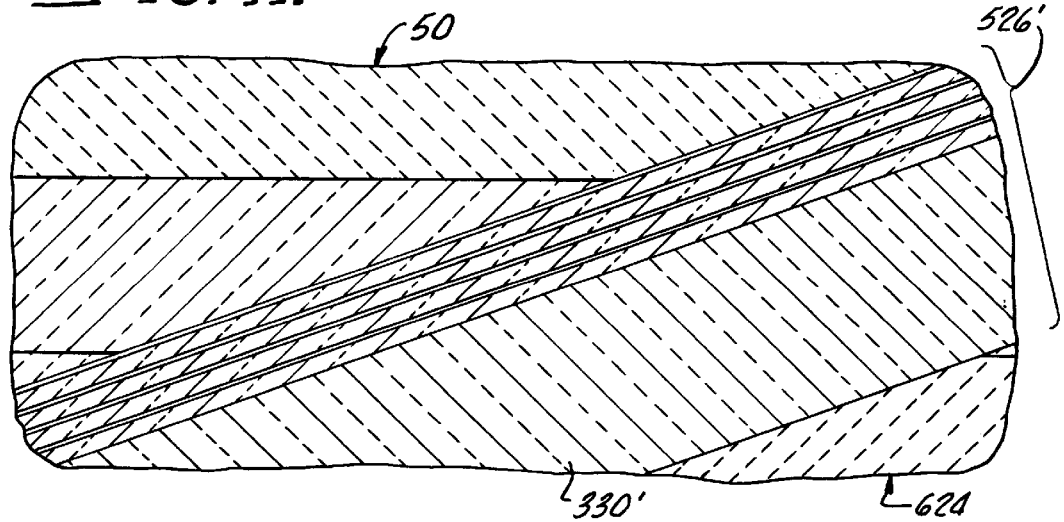

METHOD OF OPERATING A FIBER-OPTIC ACOUSTICAL SENSOR, APPARATUS FOR PRACTICING THE METHOD, AND IN-LINE FIBER-OPTIC POLARIZER USABLE IN SUCH APPARATUS

BACKGROUND OF THE INVENTION

1. Field of the Invention

The present invention relates to a method of operating a fiber-optic acoustical sensor, to an apparatus for use in practicing the method, and to an in-line fiber-optic polarizer usable in such an acoustical sensor. More particularly, the present invention is in the field of method and apparatus for a fiber-optic acoustical sensor used as a hydrophone (i.e., as a microphone used in water to receive sound transmitted through the water), and having particular utility in under-sea seismic exploration.

The present invention also relates to an in-line fiber-optic polarizer. This in-line fiber-optic polarizer is usable in an acoustical sensor embodying the invention.

2. Related Technology

Conventional electrical hydrophones are well known. In seismic exploration, these hydrophones are conventionally employed in static arrays of plural acoustical transducers which are placed on or beneath the sea floor, or in towed arrays (i.e., towed in sea water behind a transport ship or boat). The portion of the acoustical sensor immersed in sea water is generally referred to as the "wet" portion, while the portion on shore or aboard the transport vessel is the "dry" portion.

The dry portion of the sensor may include signal analyzers, recorders, and display devices, for example. Connecting the wet and dry portions of the acoustical sensor is an elongate cable or cables extending between the acoustical transducers and the dry portion of the sensor. In some cases, the acoustical transducers are simply spaced out along the length of the connecting cable in a linear array located in the distal portion of the cable. This linear array configuration of acoustical transducers is generally used for towed arrays.

In the use of hydrophone arrays for seismic exploration, acoustical energy is provided in the water (by a sounding device or explosion, for example). Sound waves from the energy source travel through the water and penetrate into the earth at the sea floor. The sound waves are reflected from geological structures beneath the sea floor (i.e., from oil shale formations, for example), travel back into the sea water above, and are sensed by the acoustical transducers of the hydrophone array. These acoustic transducers (or hydrophones) thus provide signals indicative of the sound energy recovered from the reflections sensed at particular locations in the static or towed array. In this way, the undersea geological structures can be acoustically detected, and with the collection of sufficient data, can be acoustically "imaged".

Because the recovery of sound energy is required at a multitude of spaced apart locations in order to acoustically image undersea geological structures, conventional hydrophone arrays include a multitude of acoustical transducers. Also, because of the large number of transducers in conventional electrical hydrophone arrays, the conventional electrical arrays have had to include a great number of electrical wires and active electrical circuits in the array itself as well as in the connecting cable or cables. These active electrical circuits include, for example, power distribution circuits, amplifiers, repeaters, multiplexers, and other signal conditioning and interpreting circuits. A result with a conventional electrical hydrophone array is that the hydrophone array itself, as well as the cable(s) connecting the array to the dry portion of the acoustical sensor, has to include a multitude of electrical conductors, is larger and much heavier than is convenient, and is expensive.

A particular disadvantage of these conventional electrical hydrophone arrays has been the presence of active electrical circuits within the array and connecting cable(s). These active electrical circuits require electrical power, thus requiring power distribution conductors and amplifiers in the wet portion of the array. The power distribution circuits and amplifiers utilize high voltages. Accordingly, it has followed inexorably that conventional electrical hydrophone arrays present problems with water leaking into the power distribution circuits and active electrical circuits of the array, possibly causing degraded performance because of increased capacitive coupling within the array, and also possibly causing electrical shorting in the array.

For personnel handling such conventional electrical arrays a potential shock hazard is also always present, and influences handling practices with such arrays. That is, even when the hydrophone array is really turned off, personnel have to treat it as though it were on and as though a shock hazard continuously existed. This precaution is necessary in order to establish and maintain safe handling practices.

Further, and undesirably, conventional electrical hydrophone arrays have involved a considerable expense to fabricate the wet portion of the array. This was the case because of the large number of electrical conductors in the array, the presence of the active electrical circuits, and the necessary attempts (frequently unsuccessful) both to make the array water tight during its lifetime, as well as to also be resistant to electrical malfunction, degraded performance, and shorting in the event that water leakage into the array did occur at some time during its useful life.

These problems with conventional electrical hydrophone arrays have led to the development of fiber-optic hydrophone arrays. These conventional fiber-optic hydrophone arrays use fiber-optic acoustical transducers. Light energy is conducted to and from the fiber-optic acoustical sensors along optical fibers extending in the cable portion of the array. No electrical wires are used in the connecting cable or in the array as in electrical hydrophone arrays. Accordingly, such fiber-optic hydrophone arrays do not include active electrical circuits or power distribution circuits in the wet portion of the array.

FIG. 12 illustrates a conventional architecture for a time division multiplexed (TDM) fiber optic hydrophone array. This architecture is conventionally referred to as a ladder network. In this figure, both the upper and lower lines represent fiber optic conductors. The rungs of the ladder are formed by hydrophones in the form of Mach-Zehnder interferometers (or possibly by Michelson interferometers) responsive to ambient acoustic energy. Between adjacent rungs of the ladder, a coil of the optical fiber provides a light propagation delay element having a period "T". At the distal end of the upper conductor, a light pulse of duration $\tau < T$ is applied. As this pulse proceeds to the right along the upper conductor, a coupler at each rung diverts a portion of the light energy of the pulse into the interferometer. The interferometer provides to the lower conductor, a pulse of light which is phase discriminated as a function of the ambient acoustic energy. As is illustrated, because of the time delay effected progressively along the length of the upper conductor, the pulses delivered into the lower conductor and arriving at the distal (left) end of this lower conductor are time-division multiplexed relative to one another. In other words, the user of such an architecture can distinguish the signals from each particular one of the successive hydrophones along the length of the ladder array because of the arrival of the light pulse from each hydrophone in the train of pulses returned from the array in response to each input pulse. See, "Fiber-optic Sensors—an introduction for Engineers and Scientists", edited by Eric Udd, John Wiley and Sons, 1990, chapters 10 and 11. Also see, "Fiber-optic Sensors", by T. A. Krohn, Instrument Society of America.

FIG. 13 illustrates another conventional architecture for a frequency division multiplexed (FDM) fiber optic hydrophone array. This architecture is conventionally referred to as a matrix network or topology. In this Figure, two continuous-wave light sources are provided, each modulated at a different frequency. Each light source provides light energy into a sensor, each sensor having a pair of interferometers responsive to ambient acoustic energy. The interferometers provide phase discriminated output signals to two output optical fibers. Viewing FIG. 13, the upper fiber carries two output signals, one from one interferometer of the upper pair and the other from one interferometer of the lower pair. The same is true of the lower output conductor. The signals on each conductor are distinguishable from one another because of their modulation carrier frequency. Thus, this arrangement is one of frequency division multiplexing, or FDM.

Those ordinarily skilled in the pertinent arts will recognize that this FDM matrix array concept can be expanded to an array having more than the four hydrophones seen in FIG. 13. That is, the matrix array may have N light sources each with its own modulation frequency different than the others, and $N^2$ sensors, with N output conductors each carrying N signals distinguishable from one another by their modulation frequency. FIG. 14 illustrates a generalized FDM matrix array topology for a fiber optic acoustical sensor according to this concept.

Unfortunately, a persistent problem with fiber-optic hydrophone arrays has been the existence of "strum", or low frequency noise in the output signal from the array. This low-frequency "strum" noise has severely impacted the performance of conventional fiber-optic acoustical sensors in the frequency range from less than one Hz to several hundred Hz. In fiber-optic acoustical sensors which include acoustical transducers connected to a light source and to a detector by a length of fiber optic cable, physical manipulation of this cable has a dramatic effect on the output signal noise. For example, in a towed hydrophone array in which a tow cable includes a single-mode optical fiber along which light from a laser light source is transmitted to a fiber-optic acoustical transducer, twisting, bending, and stretching of the tow cable in its noisy environment has a dramatic effect on the polarization state of the light in the optical fiber. In other words, the fiber-optic tow cable itself is in some respect a hydrophone exposed to a noisy environment including low frequency twisting, stretching, and bending occurring within the frequency band of interest. This tow-cable-hydrophone effect in turn affects the level of noise in the optical signal at the output of the acoustical transducer, which is transmitted along a return optical fiber to an optical receiver of the hydrophone array.

Further to the above, several conventional polarizers are well known. One polarizer of a fiber-optic type which is known is generally referred to as "Zing" fiber. This particular type of optical fiber has a non-circular cross sectional configuration which preferentially propagates a selected polarization of light. Another type of polarizer is the so called "bulk" polarizer. A bulk polarizer uses a body of material (usually a crystalline substance) preferentially propagating a particular polarization of light. With some transparent crystalline materials, their regular crystal lattice structure makes them usable as bulk polarizers. Still another type of polarizer is known as a Brewster stack of plates. This so-called Brewster stack uses one or more plates made of a material having an index of refraction differing from air, and defining air-material interfaces at which polarizing reflections and refractions take place according to well understood principles of optics. With a Brewster stack of plates made of glass (index about 1.5), $\Theta_B$, the Brewster angle for polarizing incidence is defined as: $\Theta_B$=arctan nH/nL, in which $n_H$ and $n_L$ are the index of refraction of the material and of air (index 1). $\Theta_B$ for glass plates is about 55° to 57°. "p" polarized light is transmitted at the end interface without loss, whereas "s" polarized light is largely reflected. Unfortunately, not one of these conventional polarizers has a character which makes it inexpensive, rugged, small in size, conveniently used with optical fiber connection both on the light supply and polarized light delivery side of the polarizer, and offers very good extinction of an undesired polarization state in the polarized light delivered from such a polarizer.

SUMMARY OF THE INVENTION

In view of the above, a primary object for this invention is to avoid one or more of the shortcomings of the related technology.

More particularly, it is an object for this invention to provide a fiber-optic acoustical sensor system in which the polarization state of light supplied to a fiber-optic acoustical transducer is controlled such as to reduce the effect of "strum" of an elongate connecting cable between a light source and the acoustical sensor.

According to an exemplary embodiment of the invention, the hydrophone apparatus is configured as a static or towed array including such an acoustical sensor system having a "dry" portion on shore or aboard a transport vessel, and a "wet" portion immersed in the sea and including an elongate fiber-optic cable extending from the dry portion to an acoustic transducer of the wet portion. The wet portion of the static or towed array includes only comparatively inexpensive components (i.e., in the portion of the array which is immersed in the sea and which incurs a significant risk of loss or damage during use). The wet portion of such a fiber-optic towed array is additionally smaller in size and lighter in weight than a comparable hydrophone array of conventional electrical construction.

Thus, according to an aspect of the invention, a fiber-optic acoustical sensor system includes an elongate fiber-optic conductor having a pair of opposite ends; means for introducing a pair of orthogonally-polarized light beams into one of the pair of opposite ends; a polarizer receiving the pair of orthogonally-polarized light beams from a second of the pair of opposite ends, and providing an output light beam of substantially stable polarization; and an optical acoustical transducer receiving the output light beam of substantially stable polarization and also receiving ambient acoustical energy, the transducer responsively providing a modulated light beam signal analogous to a characteristic of the acoustical energy.

Accordingly, a towed hydrophone array embodying the present invention may be smaller and lighter than conventional electrical arrays, and will require less storage space aboard a transport vessel. Further, the use of this new hydrophone array will be easier because its lighter weight makes it easier to deploy into the sea and to recover. Also, there are no active electrical circuits in the wet portion of the array to present a hazard of electrical shorting or shock. Accordingly, personnel handling such an acoustical array need not observe "shock hazard" handling procedures.

In order to control the polarization state of light supplied to an acoustical transducer of the acoustical sensor system, a polarizer is interposed between a light source and the transducer. Preferably, this polarizer is configured as a fiber-optic in-line device, which is disposed immediately before the acoustical transducer with respect to light transmittal from the source to this transducer.

A particularly preferred embodiment of an in-line fiber-optic polarizer includes a pair of generally coaxially aligned optical fibers having oppositely angulated end surfaces confronting one another along an optical axis. These end surfaces are disposed on opposite sides of a multi-layer dielectric stack disposed at the Brewster angle relative to the axis of the fibers, and having alternating layers of differing refractive index. This multi-layer dielectric stack serves to polarize light passing from one of the pair of aligned fibers to the other through the dielectric stack.

In one embodiment, the pair of aligned fibers at their opposite ends each may have optical surfaces perpendicular to their axis. Each of the aligned fibers is held in a respective ferrule, so that grinding, polishing and other manufacturing operations can be conducted at comparatively low unit costs and with good precision. In order to couple light into and from the pair of aligned optical fibers, respective opposite connecting optical fibers each may have perpendicular end surfaces mating with the pair of aligned fibers at the respective opposite ends. One of these connecting optical fibers receives light from a source, such as a laser, and the other conducts polarized light from the polarizer to a fiber-optic acoustical transducer. An alternative embodiment of the polarizer includes a pair of ferrules which are "pig tailed" for ease of connection, and which sandwich between them a dielectric stack disposed substantially at the Brewster angle. Yet another embodiment of the polarizer provides a dielectric stack on a carrier member disposed between ends of optical fibers, and the carrier member is itself an element of the polarizer, and is transparent to light.

Accordingly, an additional object for this invention is to provide an in-line all fiber-optic polarizer.

Yet another object for this invention is to provide such an in-line all fiber-optic polarizer as part of an apparatus for under water acoustical sensing.

Thus, according to yet another aspect, the present invention may be seen to provide an in-line fiber-optic polarizer including: a pair of optical fiber portions aligning along an optical axis and each defining a respective one of a confronting pair of end surfaces angulated with respect to the optical axis at substantially a Brewster angle; and a dielectric layer disposed between the pair of end surfaces, the dielectric layer including at least three sub-layers, including at least a pair of high-index sub-layers each adjacent to a respective one of the pair of end surfaces, and at least one low-index sub-layer disposed between the pair of high-index sub-layers, with each of the high-index and low-index sub-layers having a respective index of refraction determining the Brewster angle.

An advantage of the present invention results from the reduction in low-frequency noise component of the optical return signal obtained from such a fiber-optic acoustical sensor system, and resulting improved signal-to-noise ratio, which may be achieved in a fiber-optic acoustical sensor system by use of this invention. Actual tests of an embodiment of this invention have shown a 25 dB noise reduction in the 0 to 100 Hz. frequency range.

An additional advantage of the present invention results from the good polarizing performance, small size, relative structural simplicity, and commensurate low manufacturing cost of a fiber-optic in-line polarizer as described above. Because each acoustical transducer of an array of hydrophones may require one of the polarizers, the comparatively low cost for the polarizers reduces the overall cost of the array. Also, it is believed that a single polarizer may be used to service plural hydrophones. That is, the hydrophone array may be constructed in a branched configuration, with light from one polarizer dividing and branching out to several hydrophones. This branched construction would further reduce costs for the hydrophone array. Further, the good polarizing performance of the in-line polarizers contributes to desirable performance levels for the acoustical hydrophone array, while the small size of the polarizers helps allow a small, light, and easily handled array.

A better understanding of the present invention will be obtained from reading the following description of preferred exemplary embodiments of the present invention, taken in conjunction with the appended drawing Figures, in which the same features (or features analogous in structure or function) are indicated with the same reference numeral throughout the several views. It will be understood that the appended drawing Figures and description here following relate only to one or more exemplary preferred embodiments of the invention, and as such, are not to be taken as implying a limitation on the invention. No such limitation on the invention is implied by such reference, and none is to be inferred.

BRIEF DESCRIPTION OF THE DRAWING FIGURES

FIG. 1 presents a schematic illustration of a fiber-optic acoustical sensor system embodying the present invention and employing time division multiplexing;

FIG. 1a schematically illustrates a portion of an alternative distal ladder-type architecture for a fiber-optic acoustical sensor system embodying the present invention;

FIG. 2 presents a schematic illustration of a fiber-optic acoustical sensor system according to an alternative embodiment of the invention employing time division multiplexing;

FIG. 3 provides a schematic illustration of a fiber-optic acoustical sensor system according to another alternative embodiment of the invention employing frequency division multiplexing;

FIG. 5 is a schematic cross sectional illustration of an in-line fiber-optic polarizer usable in the fiber-optic acoustical sensor system of the present invention;

Figure 12:
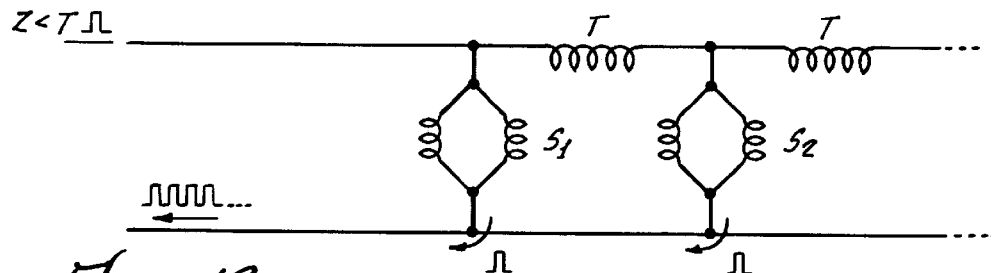
Figure 13:
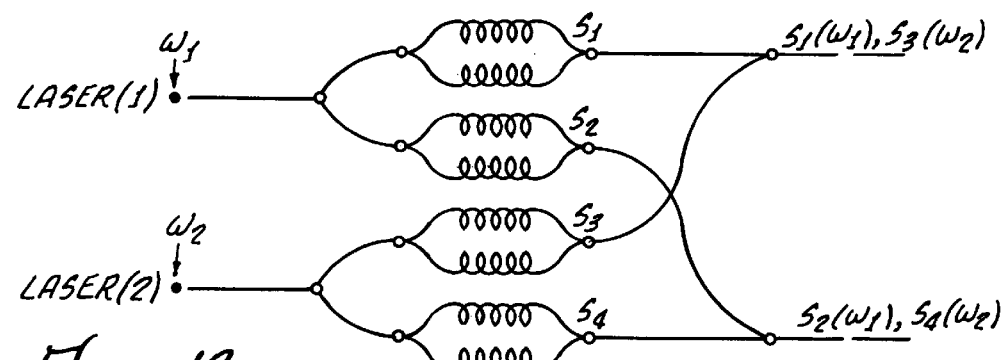
Figure 14:
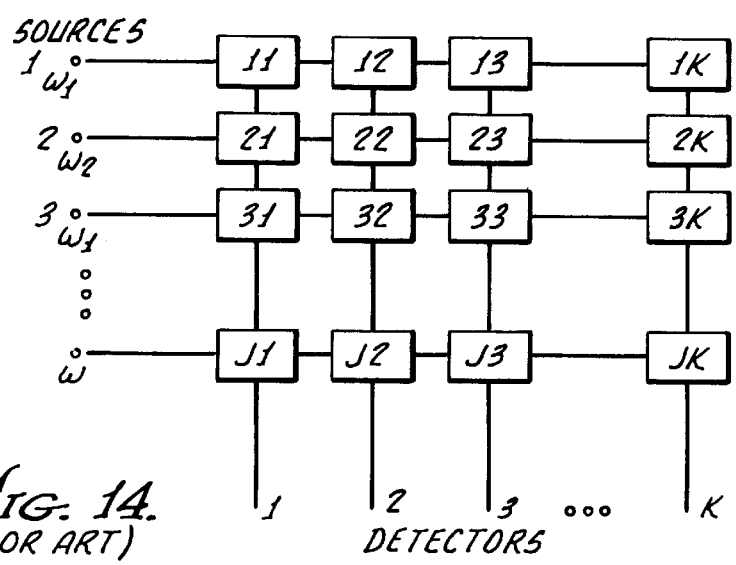

FIG. 6 presents a much enlarged schematic cross sectional illustration with a diagrammatic light-ray-trace of the in-line fiber-optic polarizer of FIG. 5;

FIG. 7 provides a schematic cross sectional illustration of an alternative embodiment of a fiber-optic polarizer according to the present invention;

FIG. 8 is a schematic cross sectional illustration of another alternative embodiment of a fiber-optic polarizer according to the present invention;

FIGS. 9 and 10 diagrammatically illustrate steps in the method of making a fiber-optic polarizer as depicted in FIG. 8;

FIG. 11 provides a schematic cross sectional illustration of yet another alternative embodiment for a fiber-optic polarizer according to the present invention;

FIGS. 12–14 are schematic presentations of conventional architectures (sometimes called, "topologies") for fiber-optic acoustical sensor systems, and are more fully considered in the "Related Technology" section of this disclosure.

DETAILED DESCRIPTION OF EXEMPLARY PREFERRED EMBODIMENTS OF THE INVENTION

Noise Reduction in a Fiber-Optic Acoustical Sensor System

Figure 1:
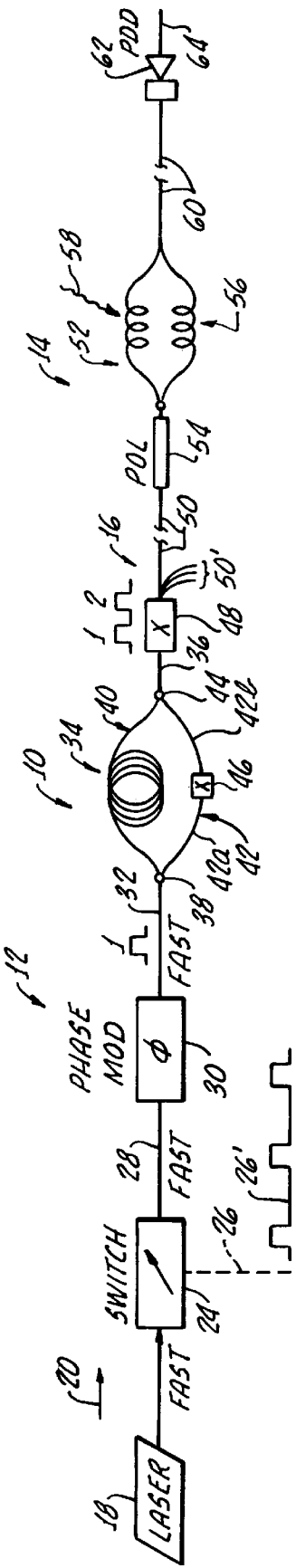

Turning now to FIG. 1, a single fiber-optic acoustical sensor system 10 of time division multiplexing (TDM) type is depicted. This sensor system 10 represents only one exemplary sensor element which may be included in an array of such acoustical sensors. Those ordinarily skilled in the pertinent arts understand that a stationary or towed array includes many (perhaps hundreds or more) of such acoustical sensors, each in effect serving a hydrophone of the array.

For purposes of illustration and presentation of the sensor system 10, it is discussed below as though it were a part of a towed array. For this reason, the sensor system 10 may be conceptually divided into a "dry" portion 12 (which as explained above, would be disposed on shore or carried aboard a transport vessel), and a "wet" portion 14 most of which is immersed in sea water during use of the sensor system. Connecting the wet and dry portions 12 and 14 is an elongate fiber-optic cable (generally indicated with the numeral 16), which in the present instance also includes a tension member (not shown), and serves as a tow cable for the towed array wet portion. As will be understood, during use of the hydrophone array, the tow cable is all or mostly in the sea water and is a part of the wet portion of the sensor system.

Considering now FIG. 1 in greater detail, it is seen that sensor system 10 includes a light source 18, which is preferably a laser. This laser light source provides a continuous-wave, polarized light beam, indicated on FIG. 1 schematically by the arrow 20. In physical reality, the laser light 20 from laser light source 18 is connected outwardly of this laser by a polarization-maintaining (PM) fiber-optic conductor 22. The polarization-maintaining fiber-optic conductor 22 can maintain two polarization states. Light polarized parallel to either the "fast" or "slow" axis of the fiber will propagate along the fiber and substantially stay polarized in these axes. As is indicated on FIG. 1, the laser light from source 18 is launched into the "fast" axis of the PM optical fiber conductor 22. The fiber-optic conductor 22 conducts the laser light 20 from laser 18 to an optical switch 24. An example of a switch which may be used for this purpose is a lithium niobiate optical switch. An optical switch of this character is available from Uniphase Telecommunications Products.

Switch 24 is controlled by a switching signal 26' conducted over a control connection 26 to switch open and closed at a controlled periodic switching rate, graphically illustrated adjacent to control connection 26. Consequently, on a PM fiber-optic conductor 28 extending from switch 24, a polarized and pulsed laser light signal analogous in time to the switching signal 26' is provided on the "fast" axis of this optical fiber conductor to a phase modulator 30. Phase modulator 30 applies a sub-carrier phase modulation to the polarized and pulsed light propagated along fiber 28, and supplies polarized, pulsed, and phase-modulated (i.e., including a phase-generated carrier) light. Preferably, the frequency of phase modulation at modulator 30 may range from about 30 KHz to about 2 MHz. This light is provided into the "fast" axis of a PM conductor 32. The numeral "1" adjacent to this graphical representation indicates a first direction of polarization, while the shape of the graphical representation is indicative of a pulse of light propagating along the fiber-optic conductor.

Those ordinarily skilled in the pertinent arts will recognize that the laser 18 itself may be used as a phase modulator rather than having to use a separate phase modulator 30 to effect this function. Thus, although in the drawing Figures the phase modulators are shown as separate schematic functional elements, this function can be performed using the laser itself.

Conductor 32 conveys the polarized, pulsed, phase-modulated light to a dual-function assembly 34. Assembly 34 functionally provides time-interleaved, orthogonally-polarized, and phase-modulated, laser light pulses on an output PM fiber-optic conductor 36. In the embodiment illustrated in FIG. 1, the assembly 34 includes a 50/50 polarization-maintaining coupler 38 which receives the polarized, and phase-modulated light pulses from conductor 32, and provides half of the light energy from each pulse as a "50% pulse" into each of two legs 40 and 42 of the assembly 34. The 50% pulses are simultaneously launched from coupler 38 into each leg 40 and 42. Because the coupler 38 is polarization-maintaining, if light is received on the "fast" axis of the conductor 32, half of the light is provided on each of the legs 40 and 42, also is on the "fast" axis of each leg. The same would be true if the light were propagated along the "slow" axis of the conductor 32. Moreover, the assembly 34 provides a bifurcated or branched polarization-maintaining light transmission path, with each branch of the path simultaneously receiving polarized light pulses (i.e., 50% pulses) from the coupler 38.

Leg 40 of the assembly 34 may be considered to be a "PM fast with time delay" leg. That is, this leg includes an elongate PM optical fiber (which is illustrated in FIG. 1 as being coiled on itself) to time-delay the polarized and phase-modulated light pulses conducted along this leg in the "fast" axis of the fiber. Consequently, leg 40 provides time-delayed, polarized, phase-modulated, pulses of light into a three-port coupler 44. Coupler 44 is a polarization-maintaining coupler. The polarized, phase-modulated, and time-delayed light pulses from leg 40 into coupler 44 and conductor 36 have a "1" polarization like those pulses provided into coupler 38 from fiber 32.

On the other hand, the leg 42 of assembly 34 may be considered to be a "PM fast/slow with 90° polarization rotation" leg. That is, leg 42 includes two sections of PM fiber, one section indicated 42a receives polarized and phase-modulated pulses (i.e., also 50% pulses) of light from coupler 38 along the "fast" axis of this fiber. Section 42a of fiber conductor is connected at splice 46 with section 42b, which section 42b is relatively rotated to receive the laser light pulses along the "slow" axis of this fiber-optic conductor section. Optical fiber section 42b connects with coupler 44 to provide polarized laser light pulses which are not time delayed to the same extent with respect to the pulses from conductor 32 propagated along leg 40, but which are shifted in their polarization by 90° to be relatively orthogonally polarized.

The pulses from legs 40 and 42 are relatively time interleaved by assembly 34 so that they can be represented as separate (in time) pulses as is graphically depicted adjacent to conductor 36. The result is that on fiber-optic conductor 36 a train of polarized, phase-modulated, light pulses which are successively orthogonally polarized and time-interleaved is provided. The pulses are alternatingly polarized at 90° relative to one another (i.e., successive pulses are orthogonally-polarized), also the pulses are time-interleaved because the time delay effected on branch 40 is sufficient to fit pulses passing along this leg in between pulses passing along the leg 42.

Conductor 36 is joined at a splice 48 to a single-mode (SM) optical fiber conductor 50. The optical fiber 50 is elongate and extends along the cable 16 to an acoustical transducer 52 (i.e., a hydrophone) located at the hydrophone array portion of the acoustical sensor system 10 (and which is further described below). The spray of fiber-optic conductors 50' from splice 48 indicates that a multitude of acoustical transducers may be provided with orthogonally polarized, phase-modulated, time-interleaved, light pulses from source 18. In this way, the light source 18 may provide light to a multitude of acoustical sensors, as was described above with the "ladder" type of matrix architecture, for example.

An orthogonally-polarized and time-interleaved train of polarized, phase-modulated laser light pulses is conducted along the SM fiber 50. These pulses are indicated as "1" and "2" on the graphical portion of the Figure, respectively indicating original polarization and 90° relatively-rotated polarization for the pulses. It will be noted that each pulse of a particular polarization is between two other adjacent pulses of orthogonal relative polarization. However, this graphical illustration should not be taken as an indication of pulse duration in comparison to the time interval between pulses. In fact, the pulses may be relatively short in duration, and be separated by a time interval many times this pulse duration.

As explained above, bending, stretching, and twisting of the tow cable 16 and fiber 50 has a dramatic effect upon the polarization of light conducted on optical fibers extending along this cable. However, light on an optical fiber which is orthogonally-polarized always maintains its characteristic of being orthogonally-polarized. That is, a disturbance (bend, twist, or stretch, for example) of the cable 16 and fiber conductor 50 which, for example, causes a "1" light pulse to become in whole or in part left circularly polarized, will cause the adjacent "2" light pulses to become equivalently right circularly polarized. The same applies with respect to shift of plane-polarized light waves.

That is, as a disturbance of cable 16 and conductor 50 causes pulses of one polarization to be decreased in intensity with respect to a selected direction of polarization, the orthogonally-polarized light pulses will equivalently increase in intensity at this selected polarization direction. Consequently, the light pulses of orthogonal polarization maintain their orthogonal polarization along the length of fiber 50. When incident on a polarizing element 54 which selects any single polarization, one of these orthogonal polarizations will provide a power transmission of at least 50% of the maximum possible value through a polarizing element 54, to acoustical transducer 56 (power level at the proximal end of the fiber 50 and attenuation along the length of this fiber to its distal end being considered in this maximum value).

Acoustical transducer 52 includes a polarizer 54 and a fiber-optic transducer 56. This transducer 56 may be of the Mach-Zehnder type, which is well known. A variety of polarizer designs or types may be employed as polarizer 54. For example, a bulk polarizer design, or a section of "Zing" fiber may be used to perform the polarization function of polarizer 54. Most preferably, an all-fiber-optic, in-line polarizer as is described below is used as polarizer 54. Consequently, as sequential orthogonally-polarized, phase-modulated laser light pulses arrive at polarizer 54 along fiber 50, this polarizer selects one polarization of light to pass with at least 50% of the maximum possible value to transducer 56. That is, the other (non-selected) polarization states experiences transmission of less than 50% of the maximum value. However, because the original "1", "2", "1", "2", etc., polarization of these pulses has undoubtedly been modified by their passage along fiber 50 in the undersea environment (which is never quiescent and disturbs cable 16 and fiber 50 as described above), the polarization state of the light pulses received at polarizer 54 is uncertain in all respects except that orthogonality of the polarization states is maintained.

Regardless of the disturbances experienced by cable 16 and conductor 50, because of the orthogonal polarizations of the successive light pulses in the train of pulses arriving along conductor 50, these pulses vary in power level equivalently and in opposition to one another at the selected polarization. Thus, light power level from polarizer 54 to transducer 56 is at least 50% for one of the two polarization states transmitted to the transducer. By choosing the larger of the two signals for subsequent electronic processing, we avoid excessive fading due to polarization selection.

The transducer 56 may be of conventional configuration, and responds to an ambient acoustical energy signal (i.e., sound in the water—represented by arrow 58) to provide a phase-discriminated light output signal on output return optical fiber conductor 60. The light output signal on optical fiber conductor 60 will be analogous to a characteristic of the acoustical energy 58. For example, the light output signal may be analogous to a wave form, wave length, intensity, or frequency (or any one or all of these characteristics) of the ambient acoustical energy 58.

As those who are ordinarily skilled in the pertinent arts will understand, the conductor 60 is elongate and extends back along the length of cable 16 to the "dry" portion 12 of the sensor system 10. At its termination, conductor 60 connects with a polarization diversity detector (PDD) 62, which provides on an output conductor 64 an electrical signal analogous to the sound energy signal 58. In receiving electronics for the PDD's 62, a decision is made, and of the two polarization states (i.e., the two orthogonal polarization states of light arriving at PDD 62), the signal of greater magnitude is selected.

At the dry portion of the sensor, signal processing, display, and recording devices (not shown) may be employed to utilize the information obtained from the sound energy 58 in the sea water. For example, as was explained above, the sound energy 58 may have originated with a reflection from an undersea oil shale deposit. In such a case, the information obtained from a multitude of such acoustical sensors in a hydrophone array would be used to acoustically "image" the oil shale deposit using techniques well known in the art of under-sea seismic exploration.

Also, at this point it must be noted that an improvement in performance over the conventional technology can be realized by inclusion of a polarizer at the location indicated for polarizer 54, and without the use of orthogonally polarized light pulses launched into the proximal end of the cable 16 and fiber 50. That is, light pulses which are not polarized orthogonally (as is conventional) may be used. Without the use of orthogonally polarized light pulses, but with a polarizer disposed at the location of polarizer 54 shown in FIG.

1, the intensity of the output signal from the acoustical transducer may vary over time, sometimes disappearing altogether as the light power level at the selected polarization state transmitted by polarizer 54 varies (this will be dependent upon the disturbances experienced by the cable 16—and the resulting polarization state of light delivered to polarizer 54). However, the phase noise introduced by variations of the polarization states will be eliminated. In other words, the polarization-induced phase noise experienced in conventional fiber optic sensors of this type will become intensity noise.

Figure 1A:
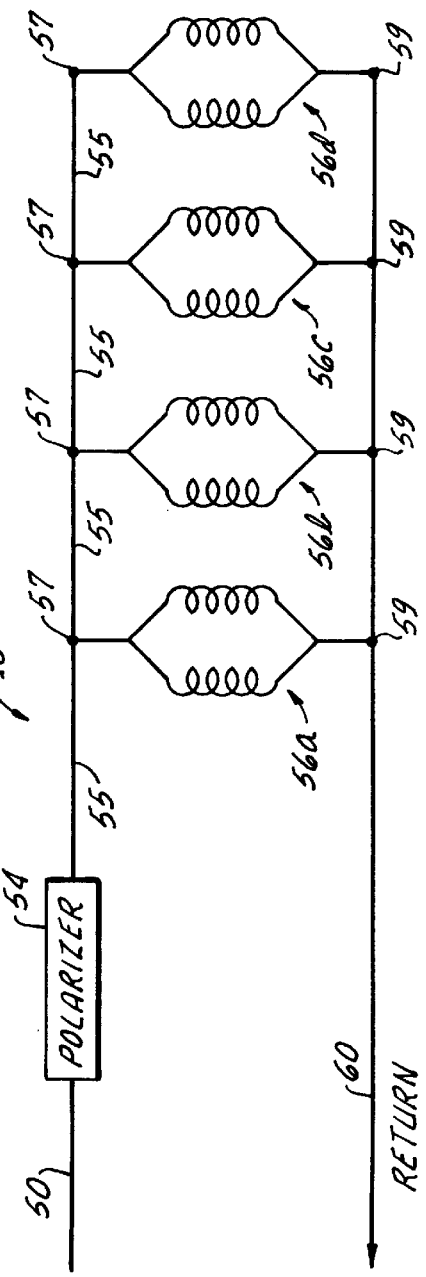

FIG.1a provides a fragmentary view of an alternative construction for the distal portion of a sensor system 10' (otherwise like sensor system 10) at the acoustical transducers 52. As is seen in FIG.1a, a single polarizer 54 may feed polarized light into a ladder-type network of hydrophones, each designated with the numeral 56, and having a suffix added. Each of the individual acoustical transducers (i.e., the hydrophones 56) receives stable polarized light (i.e., also pulsed, and phase-modulated) from the polarizer 54. It will be recognized that the user of the word "stable" is not intended to imply that the light provided by the polarizer 54 to the hydrophones is unchangeable in its polarization state. This is not the case, because as the light propagates further along the sensor system, perturbations of the fiber optic cables can disturb the polarization state. However, the polarization state of the light received by the hydrophones 56 varies at a greatly reduced rate compared to the polarization state of the light before the polarizer 56. Thus, the noise reduction advantage of this invention with respect to polarization-induced phase noise generated in elongate cable 50 is realized at each hydrophone 56 of the ladder network, while using only a single polarizer to service a plurality of hydrophones.

The light from polarizer 54 is provided to the hydrophones 56 via a ladder configuration of connecting optical fibers 55 including plural optical splitters 57 each providing a fractional portion of the light pulses to a respective one of the several acoustical transducers 56a, 56b, 56c, 56d, etc. From the acoustical transducers, output signals are connected into a return optical fiber 60 by couplers 59 for provision along this return conductor 60 to the PDD 62, in the way explained above. Because of the "ladder" architecture of this arrangement of transducers, the differing lengths of connecting fibers 55 effects an additional element of TDM on the return signals conveyed along conductor 60. Consequently, the signals from each individual one of the hydrophones 56 in each ladder network can be distinguished from one another. This aspect of TDM architecture will be familiar to those ordinarily skilled in the pertinent arts, and is additionally explained above with reference to FIG. 12. This construction of FIG.1a has the advantage of reducing the number of polarizers 54 required to provide polarized light to an array of many transducers 56a, 56b, etc.

Figure 2:
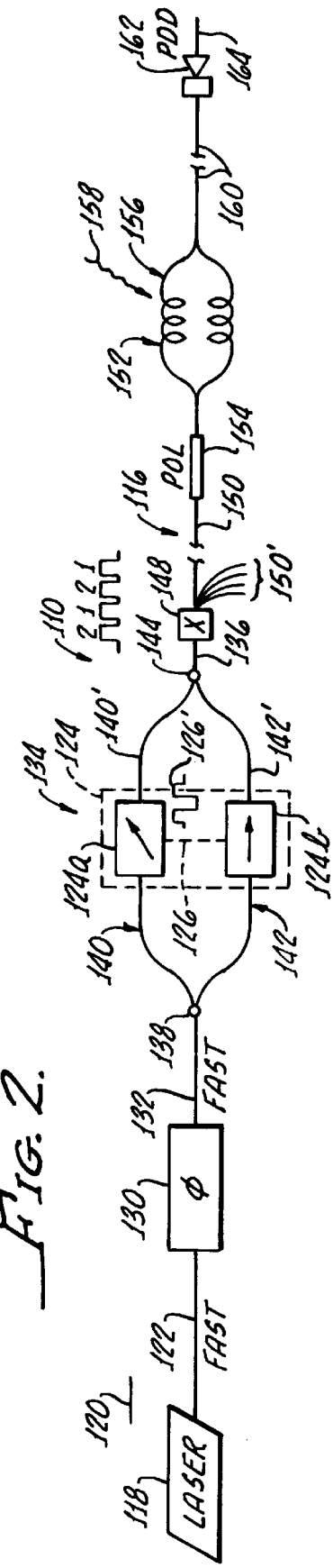

FIG. 2 illustrates an acoustical sensor system according to an alternative embodiment of the invention, which in this case employs another implementation of time division multiplexing. The basics of this type of multiplexing will be known to those ordinarily skilled in the pertinent arts, and is also discussed above with reference to FIGS. 13 and 14. In order to obtain reference numerals for use in describing this embodiment of the invention, features which are the same as, or which are analogous in structure or function to, those features described above are referenced with the same numeral used above, and increased by one-hundred (100).

Viewing FIG. 2 it is seen that an acoustical sensor system 110 includes a laser light source 118. In this embodiment, the fiber-optic conductor 122 provides continuous wave polarized laser light on the "fast" axis of this conductor to a phase modulator 130. Phase modulator 130 applies a radio frequency (RF) phase modulation to the continuous wave polarized light propagated along fiber 122, and a PM fiber-optic conductor 132 conducts this polarized phase-modulated laser light along the "fast" axis of this fiber to a dual-function assembly 134.

In this embodiment, the dual-function assembly 134 functionally provides time-interleaved orthogonally-polarized and phase-modulated (i.e., having an RF phase generated carrier) laser light pulses on an output PM fiber-optic conductor 136. In the embodiment illustrated in FIG. 2, the dual-function assembly 134 includes a 50/50 PM coupler 138 which receives the continuous wave polarized, and phase-modulated laser light signal from conductor 132, and provides half of the light into each of two PM "fast" legs 140 and 142 of the assembly 134. Essentially, the assembly 134 is a light chopper, with one of the legs including a 90° relative rotation of the polarization direction of the laser light. The light chopping function can be accomplished, for example, by use of a Mach-Zehnder switch 124 with complimentary outputs on a single substrate. Further considering FIG. 2, it is seen that each leg 140 and 142 includes a respective one of two optical switches 124a and 124b. These switches 124 may be lithium niobiate optical switches of the type described above. Switches 124a and 124b are controlled in opposition to one another (i.e., are complimentary) by a switching signal 126' conducted over a control connection 126 to switch open and closed in opposition to one another at a controlled periodic switching rate.

Switch 124a provides laser light pulses into the "fast" axis of PM fiber 140', which completes this leg by connection into a three-port coupler 144. On the other hand, leg 142 includes a PM fiber 142' which receives the laser light pulses from switch 124b, and which couples these pulses into the "slow" axis of the fiber, and into a respective port of coupler 144. The fiber 142' is rotated at coupler 144 relative to the polarization direction delivered into this coupler by fiber 140', so that orthogonally polarized light is provided into this coupler. PM optical fiber 136 extends from coupler 144 to a splice 148. At splice 148, PM fiber 136 conducts the light pulses from assembly 134 into a single mode (SM) fiber 150. As was the case above, the SM fiber 150 extends along the length of the tow cable 16 to the hydrophones distant from the dry portion of the sensor 110. Again, only a single hydrophone is shown for purposes of illustration.

The spray of fiber-optic conductors 150' from splice 148 indicates that a multitude of acoustical transducers may be provided with orthogonally-polarized, phase-modulated, time-interleaved, light pulses from source 118. In this way, the light source 118 may provide light to a multitude of acoustical sensors, as was described above.

Figure 3:
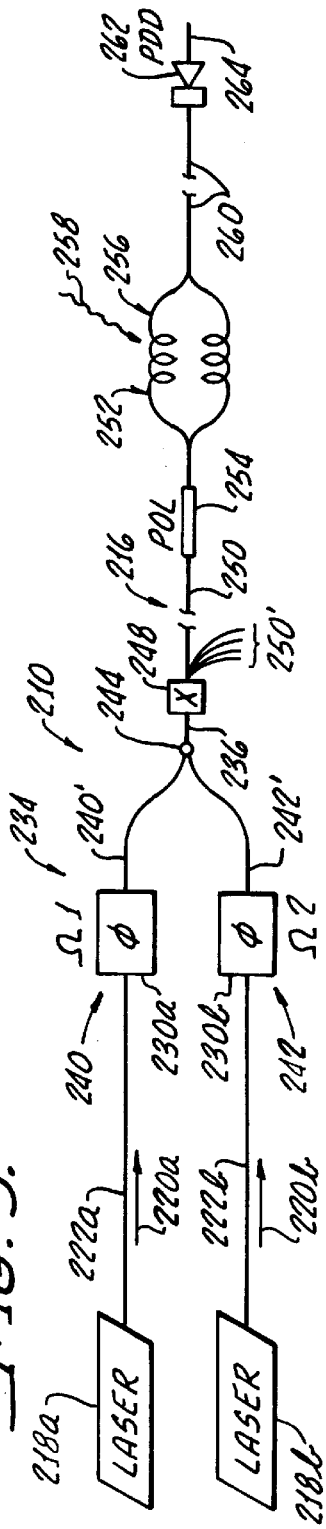

Turning now to FIG. 3, an alternative embodiment of acoustical sensor system according to the present invention, and which also utilized frequency division modulation (FDM), is depicted. In order to obtain reference numerals for use in describing this embodiment of the invention, features which are the same as, or which are analogous in structure or function to, those features described above are referenced with the same numeral used above, and increased by two-hundred (200) over the reference numeral used in FIG. 1.

Viewing FIG. 3 it is seen that an acoustical sensor system 210 in this case includes two laser light sources 218a and 218b, each providing continuous-wave polarized laser light. The laser light sources 218a and 218b differ in optical frequency. These frequencies may be referred to as "F1" for source 218a, and "F2" for source 218b. The optical frequency difference between F1 and F2 of the two lasers 218a and 218b can not be too large. The frequencies have to be close enough to one another to maintain orthogonality through the elongate cable 250. In this embodiment, a respective fiber-optic conductor 222a, 222b provides laser light on the "fast" axis of this conductor to a dual-function assembly 234. In this case also, assembly 234 has two legs, respectively indicated with numerals 240 and 242, and functionally provides continuous-wave, phase modulated, orthogonally-polarized laser light on an output PM fiber-optic conductor 236. In this embodiment, each polarization of the orthogonally-polarized light has a differing modulation frequency. The modulation frequencies differ from one another by a frequency difference at least equal to or larger than a detection band width desired for the sensor system 210.

Continuing with consideration of FIG. 3, it is seen that continuous-wave, polarized light received from each laser 218a and 218b is provided into each of the legs 240 and 242. In order to provide frequency-division discrimination between the laser light from each leg of the assembly 234, each leg includes a respective phase modulator 230a and 230b. These phase modulators are employed to impose respectively differing modulation on each of the continuous-wave, polarized light beams in the legs 240 and 242 so that the light in each leg downstream of phase modulators 230a and 230b (i.e., to the right of these phase modulators viewing FIG. 3) has a phase-generated RF carrier of differing frequency. The difference of the two optical frequencies must be about 10 times the difference of the modulation frequencies. In other words, the modulation frequency difference will be about 10% of the optical frequency difference.

Phase modulator 230a provides polarized continuous-wave, phase-modulated laser light into the "fast" axis of PM fiber 240', which completes this leg by connection into three-port coupler 244. In the other leg 242, this leg includes a PM "slow" fiber 242' which receives the polarized, continuous-wave, phase-modulated laser light from phase modulator 230b, and which couples this light into the coupler 244. PM optical fiber 236 extends from coupler 244 to a splice 248. Thus, the laser light propagated rightwardly (viewing FIG. 3) is continuous-wave, and with orthogonally polarized components phase modulated at frequencies respective to each polarization.

At splice 248, PM fiber 236 conducts the continuous wave, orthogonally-polarized, and phase-modulated light from the respective legs 240 and 242 of assembly 234 into a single mode (SM) fiber 250. Again, the spray of conductors 250' from coupler 248 indicates that the light sources 218a and 218b can supply light to a plurality of acoustical transducers in a matrix architecture, as was discussed above with respect to the embodiment of FIG. 2. The remainder of the embodiments seen in FIG. 3 is the same as that described above with reference to FIG. 2, and the same reference numerals are used for the appropriate features (i.e., increased by 200 over FIG. 1 or by 100 over FIG. 2).

In view of the above, it is seen that the orthogonally polarized light provided into the proximal end of the cables 16, 116, and 216 in each embodiment described above insures that one of the orthogonally polarized light components will provide light power to the optical acoustical transducers 56, 156, and 256 with no more than 50% loss at the polarizers 54, 154, and 254. Further, the polarizers 54, 154, and 254 insure that noise generated by uncontrolled polarization states resulting from or caused by disturbances of the cable 16 (116, 216) over its length in a noisy undersea environment and appearing in the light provided to the acoustical transducers 52 (152, 252) is substantially removed or do not appear in an unmanageable form in the output signal from these transducers. As mentioned above, remaining noise appears as intensity noise, and is easily dealt with by use of an automatic gain control.

Figure 4:
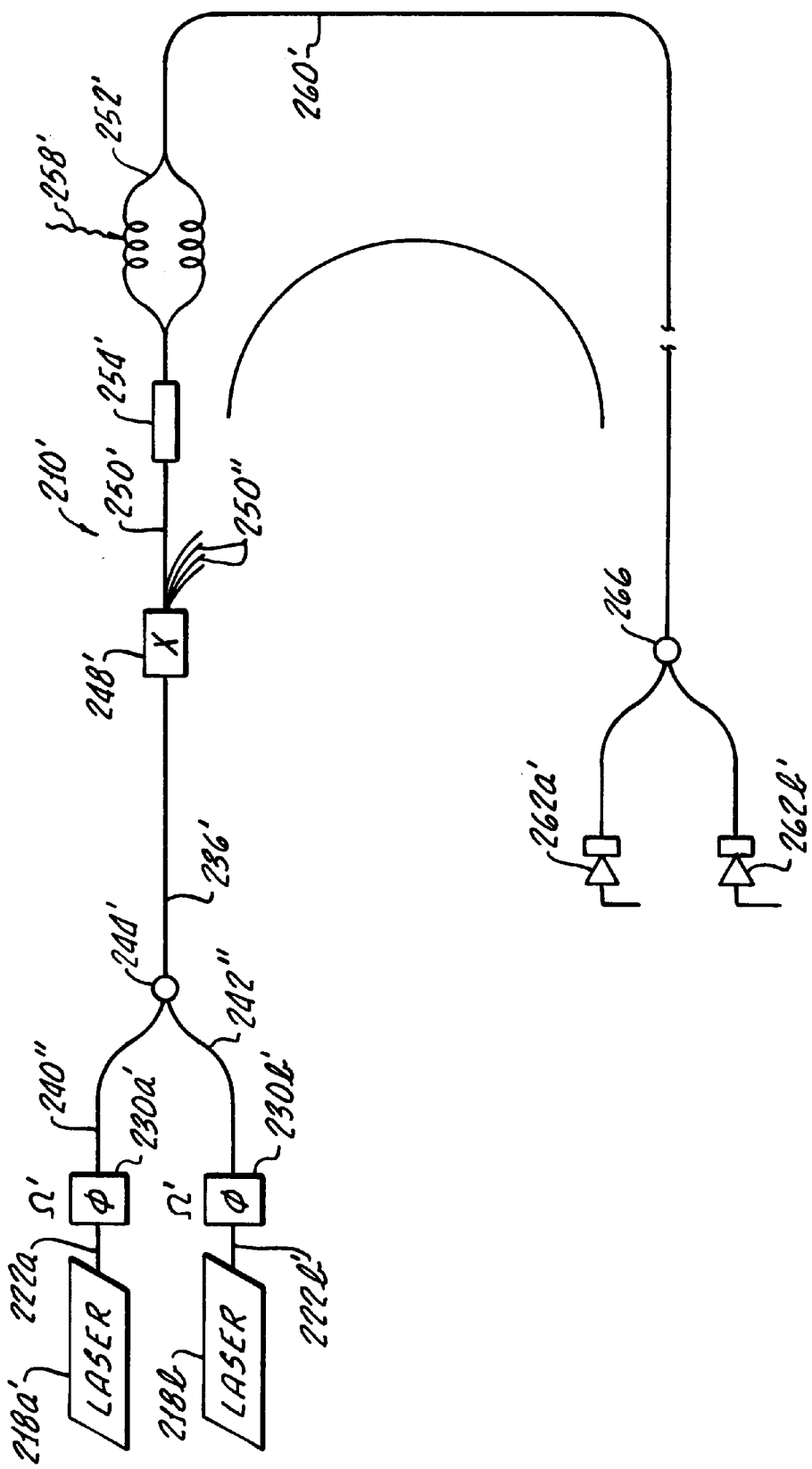
FIG. 4 is a schematic illustration of a fiber-optic acoustical sensor system according to still another alternative embodiment of the invention employing wavelength division multiplexing.

Considering FIG. 4, yet another alternative embodiment of acoustical sensor system according to the present invention, and which uses wavelength division multiplexing (WDM), is depicted. In order to obtain reference numerals for use in describing this embodiment of the invention, features which are the same as, or which are analogous in structure or function to, those features described above are referenced with the same numeral used above in FIG. 3, and having a prime (') added thereto. Numerals which were already primed in FIG. 3 have a double prime in FIG. 4.

Viewing FIG. 4, an acoustical sensor system 210' also includes two laser light sources 218a' and 218b', each providing continuous-wave polarized laser light. The lasers 218a' and 218b' differ from one another in that one (218a') provides light at a wavelength $\lambda 1$, while the other laser 218b' provides laser light at a wavelength of $\lambda 2$. A respective fiber-optic conductor 222a', 222b' transmits the respective laser light on the "fast" axis of each conductor to a respective modulator 230a' and 230b', from which the polarized and modulated laser light is connected to a polarization-maintaining three-port coupler 244'. Fiber 240" connects the light from modulator 230a' to the coupler 244', while the fiber 242b" is relatively rotated at coupler 244' so that orthogonality of the polarized and modulated light is achieved.

An alternative device which may be used here rather than coupler 244' is a polarization maintaining wavelength division multiplexer (recalling that the exemplary illustrated embodiment has only two lasers, and more than two lasers and respective wavelengths may be employed). In the latter case, a multiplexer rather than a coupler will be used.

From the coupler 244', a PM fiber 236' transmits the laser light now having an orthogonal polarization and differing wavelengths on each axis, to a splice 248', at which this light is launched into the single mode fibers 250' (and 250"). Beyond the hydrophones 252', a single mode fiber 260' transmits the resulting signal to a wavelength division demultiplexer 266. Light signals of respective wavelengths are then routed to respective detectors 262a' and 262b'.

In the embodiment of FIG. 4, it is seen that wavelength-division discrimination between the laser light from each hydrophone of the sensor can be effected, and respective acoustic signals are detected at differing wavelengths. The difference in operating wavelengths is small enough to maintain orthogonality in the sensor system 210' after the coupler 244', yet large enough that a wavelength sensitive element can separate the two signals from one another at the receiver (i.e., at the demultiplexer 266 preceding detectors 262a' and 262b').

All-fiber-optic In-line Polarizer

Turning now to FIGS. 5 and 6, an embodiment of an all-fiber-optic, in-line polarizer apparatus most preferred for use as polarizer 54 (154, 254, and 254' also) is depicted schematically. This all-fiber-optic polarizer has the advantage of small size, rugged construction, low cost, and excellent polarizing performance, as will be seen in view of the description below. In order to obtain reference numerals for use in describing this polarizer, and to avoid confusion with the apparatus previously described, reference numerals starting with the number 300 are employed in FIGS. 5 and 6.

Viewing FIG. 5 it is seen that an all-fiber-optic polarizer 54 includes a pair of confronting optical ferrules 300 and 302 each holding respective portions 304 and 306 of optical fiber, which are mutually aligned with one another along an optical axis 308. Ferrules 300, 302 (as well as additional ferrules as will be seen) are held in alignment sleeves, which alignment sleeves are conventional and are not illustrated. Each of the ferrules 300 and 302 defines a respective bore 310, in which the respective optical fiber portions 304 and 306 are secured. The conventional way of securing optical fibers in a ferrule is to provide the bore of the ferrule and the fiber with respective inner and outer diameters which are closely matched, and to glue the fiber in place in the ferrule bore. For example, the fiber outer diameter might be 125 $\mu$m, while the inner diameter of the bore 310 may be 126 $\mu$m. Thus, the axis of the optical fiber portions 304, 306, and of bores 310 are precisely aligned, and cooperatively define the optical axis 308.

Each of the ferrules 300, 302 (and the optical fiber portions 304, 306 within these ferrules) defines a respective acutely angulated, optically-flat end surface 312, 314. The end surfaces 312, 314 confront one another, and each is disposed at an acute angle $\alpha$ relative to the optical axis 308. The complement of this angle $\alpha$ (i.e., 90°—$\alpha$) is referred to herein as $\Theta$, and will be used in several equations relating to the optical performance of the polarizer 54, as will be seen. In this embodiment, in order to conduct light into and from the polarizer 54, each of the ferrules 300 and 302 (and fiber portions 304, 306) also defines an optically flat perpendicular end surface 316, 318, respectively opposite to the ends of the fiber portions at which surfaces 312 and 314 are defined. At each of these end surfaces 316, 318, the polarizer 54 interfaces with another optical fiber having a perpendicular end surface, and the termination portion of which is held in a respective ferrule 320 and 322. According to the description above, the ferrule 320 would receive a termination end portion of fiber 50 (i.e., the optical fiber in cable 16 extending from the dry portion of the acoustical sensor system 10). A fiber 324 held in ferrule 322 extends to acoustical transducer 56, as is annotated on FIG. 5. Thus, it is seen that in this embodiment, each of the ferrules 320 and 322 is "pig tailed" or has a length of the optical fiber terminated in the ferrule which extends outside of the ferrule itself. However, it will be understood that this detail of construction for the polarizer 54 is a matter of choice and convenience, and alternative constructions are depicted and described below.

Turning now to FIG. 6, it is seen that one of the surfaces 312 or 314 carries a dielectric coating, generally referred to with the numeral 326. Viewing FIG. 6, it will be understood that the optical fibers 304 and 306 include a core portion in which light transmission along the optical fiber occurs (as illustrated), and a cladding portion surrounding this core portion (illustrated only in part in FIG. 6). The scale of FIG. 6 is such that the outer boundary of the cladding portion of the optical fibers, and all of the ferrules 300, 302 are outside of the view of this Figure.

The dielectric coating 326 is of multi-layer construction, and is made up of plural alternating sub-layers of two materials. One of these materials has a comparatively high index of refraction, and the other has a comparatively low index of refraction. Herein, when "index" is used, the reference is to index of refraction, unless otherwise noted. Also, it is seen that the sub-layers of dielectric layer 326 are indicated on FIGS. 5 and 6 with the numeral 326 with the alphabetic suffix "a, b, c", etc. added, proceeding in the direction of light propagation through the layer 326. Sub-layers 326 a,c,e,g, and i, are high-index sub-layers, while the other sub-layers are low-index sub-layers.

In the preferred embodiments presently described, the preferred material for the high-index dielectric material is silicon, with a refractive index of 3.5 to 4. An alternative material which may be used for the high-index dielectric material in a polarizer according to this invention is germanium, with an index of about 4.

Other materials which might be usable for the high-index sub-layers, although they are less preferred, are titanium dioxide (index about 2.3), tantala (index about 2.1), and hafnium oxide (index about 2.05). Preferably, the low-index material is silica (index about 1.45 to 1.50). Another material for consideration as the low-index sub-layers is magnesium fluoride (index about 1.38).

Those skilled in the optical arts may recognize the multi-layer dielectric coating structure 326 depicted between the angled ends surfaces 312 and 314 of fiber portions 304 and 306, and along optical axis 308, as an extremely small sized functional analog of a Brewster stack-of-plates polarizer, and the angle $\Theta$ as the Brewster angle ($\Theta_B$) of the stack. This angle $\Theta_B$ is equal to the arctan of the ratio of the index of the high-index material divided by the index of the low-index material (i.e., $\Theta_B$=arctan $n_h/n_l$). For the interface between air (index 1) and common window glass (index about 1.5), for example, this angle is variously given in the literature at about 55° to 57°. For silicon with an index of 3.75 and silica with an index of 1.49, $\Theta_B$=70°.

However, further viewing the dielectric coating layer 326, it is seen that the layer 326 includes nine sub-layers 326a–326i which are not merely a stack of loose or glued plates as with a conventional Brewster stack polarizer, but are actually integral with one another. It will be understood that the embodiment illustrated in FIG. 6 is merely illustrative, and that the coating layer 326 may have more or less than nine sub-layers. Moreover, the sub-layers of dielectric layer 326 are formed on one of the surfaces 312, 314, by "growing" the material of each successive sub-layer on this surface (i.e., in succession over one of the surfaces 312, 314, and over the preceding sub-layers in the case of each sub-layer after the first). For example, ion beam, thin-film vacuum deposition may be used to form the successive sub-layers 326 on one of the surfaces 312, 314. As these sub-layers are formed, they span the end of the optical fiber portion 304 or 306, which is coextensive with the surface 312 or 314.

These nine sub-layers of alternating dielectric material in the embodiment illustrated in FIG. 6 define ten interfaces at which there is a change in refractive index through which the light conducted along fiber portion 304 may pass. The dielectric layer 326 is designed to pass substantially 100% of the light polarized in the plane of incidence (i.e., "p" polarization), while blocking (i.e., extinguishing) almost 100% of the light polarized normal to the plane of incidence (i.e., "s" polarization).

FIG. 7 illustrates an alternative embodiment of a polarizer according to the present invention. In order to obtain reference numerals for use in describing the embodiment of FIG. 7, features which are the same as those described above (or which are analogous in structure or function) are indicated with the same numeral used above, and increased by one-hundred (100).

Turning to FIG. 7, it is seen that a polarizer 154 includes a pair of confronting optical ferrules 400 and 402. Ferrule 402 has a "pig tail" optical fiber 424, which extends externally of this ferrule to the transducer(s) 56, as is indicated by the arrow and annotation on FIG. 7. At its left end (viewing FIG. 7), the ferrule 402 has an angulated surface 414 which is optically flat, but carries no dielectric coatings. The surface 414 is angulated at $\Theta_B$. Because the "pig tailed" ferrule 402 does not carry any dielectric coating its manufacture is eased, even though it does have a pig tail to be handled during manufacturing.

In contrast, the ferrule 400 holds a portion 404 of optical fiber, and defines an angulated surface 412 which is optically flat, is angulated at $\Theta_B$ to complement with surface 414, and which carries the dielectric coating 426 (as is indicated by the arrowed numeral on FIG. 7). At its opposite end, the ferrule 400 defines optically flat perpendicular surface 416, at which it interfaces with ferrule 420. Like the ferrule 320 considered above, ferrule 420 is easily manufactured even though it also has a pig tail (in this case, indicated to be the optical fiber 50 from cable 16).

Now, in manufacture of a polarizer as illustrated in FIG. 7, the ferrule 400 carries the dielectric coating 426, and is also easily manufactured because it does not include any pig tail of optical fiber which must be handled during the vacuum deposition process to "grow" the sub-layers of coating 426. In other words, the embodiment seen in FIG. 7 has a distinct manufacturing advantage because the ferrule 400 which carries the dielectric coatings 426 (and which, therefore, must be handled through a vacuum deposition process) is a small component with no elongate pig tail of optical fiber to complicate this handling. This ferrule, when finished with optically flat perpendicular surface 416 at one end and optically flat angulated surface 412 at the other end and carrying coating 426 is simply disposed between ferrules 402 and 420, which have matching ends to align the optical fibers.

Operation of the polarizer seen in FIG. 7 is the same as that described above.

FIGS. 8–10 depict another embodiment of polarizer according to the present invention, and steps in its manufacture. In order to obtain reference numerals for use in describing the embodiment of FIGS. 8–10, features which are the same as those described above (or which are analogous in structure or function) are indicated with the same numeral used above, and increase by two-hundred (200) over FIGS. 5 and 6.

Considering FIG. 8, it is seen that a polarizer 254 in this case includes only two major components, both of which are optical ferrules (500, and 502) complementing one another at the $\Theta_B$ angle. Both of the ferrules are "pig tailed", thus eliminating the need for other ferrules to interface the polarizer 254 with other devices. As is conventional, these two ferrules are held in an alignment sleeve (not shown) in order to align the ferrules and the fibers they hold along an optical axis. One of these optical ferrules 500 or 502 carries the dielectric coating 526, as is indicated by the arrowed numeral on FIG. 8. In this case, however, rather than the dielectric coating being "grown" on a surface of the one ferrule (as was the case with the embodiments of FIGS. 5, 6, and 7), the dielectric coating 526 is first grown on a carrier, then secured to one of the ferrules at the surface 512 or 514 thereof, and the carrier is removed, followed by finishing off of any protruding portion of the coating, if necessary.

Viewing FIG. 9, a substrate 330 is provided, upon which a multi-layered dielectric coating 526 is applied. It will be appreciated viewing FIGS. 9 and 10, that the relative thickness of the coating 526 (and of the sub-layers of this coating) is greatly exaggerated for purposes of illustration. As was explained above, the dielectric coating 526 may be grown on the substrate 330 using ion beam, thin-film vacuum deposition, for example. The substrate 330 may be silicon, for example, or may be another material chosen both for its ability to provide a foundation upon which the dielectric coating 526 is grown, and for its ability to be separated from this coating. The substrate 330 provides a planar surface 332 upon which the first layer of the coating 526 is applied. Successive sub-layers of the coating 526 are applied one after the other on the substrate 526 until the coating 526 has the desired thickness and number of sub-layers. The dielectric coating 526 extends across the entire surface 332. Alternatively, a "release" layer or coating may be interposed between the substrate 330 and the first sub-layer of the coating 326, and later may be separated from the dielectric coating (that is, from the first sub-layer of this coating).

As FIG. 10 illustrates, after the dielectric coating 526 is grown on the substrate 330, a pig tailed ferrule 500 or 502 is attached to the coating using a layer of adhesive (indicated by the arrowed reference numeral 334). In fact, a multitude of such ferrules may be attached adjacent to one another on the coating 526 so that use is made of substantially the entire extent of the coating as formed on the substrate 330. Only a single such ferrule is shown in FIG. 10 for purposes of illustration. Next, the substrate 330 is removed, leaving the dielectric coating 526 secured to the ferrule 500 or 502. The substrate 330 may be removed by dissolving it, for example. Alternatively, the "release" coating on the substrate may be dissolved, and the substrate can then be used again. Because the dielectric coating 526 is very thin, it is expected that the ferrules 500/502 can then be broken apart, leaving each with its own portion of dielectric coating adhesively secured thereto. Each such "coated" ferrule is then combined with another ferrule (which is without a dielectric coating) to complete a polarizer as described above.

FIG. 11 illustrates still another alternative embodiment in which a plate-like dielectric sub-layer stack 526' is placed between two pig tailed ferrules. The plate like stack 526' need not be secured to either ferrule, or can be adhesively secured to one or both of the ferrules. In order to make a polarizer as depicted in FIG. 11, a coated substrate would be prepared as described above in FIG. 9, with the exception that in this case the substrate is definitely silicon (or one of the materials selected for the dielectric of the dielectric coating if not silicon and silica as described above), and the dielectric sub-layer coatings applied to the substrate are not removed. Instead, the substrate itself is subsequently reduced to a thickness sufficiently thin so as to allow the substrate itself to become a part of the polarizer stack.

In other words, for the embodiment shown in FIG. 11, a substrate is prepared as shown in FIG. 9, with the substrate being made of one of the materials of the dielectric stack. In this case, the material of the substrate is selected to be silicon, the high-index material used in the dielectric stack. The alternating sub-layers of dielectric are grown on this substrate, and the thickness of the substrate is subsequently reduced by grinding or chemical milling (for example) to about 0.001 inch. Because the dielectric stack 526' is made of successive sub-layers of silica and silicon (in this example), the silicon of the substrate simply becomes one of the sub-layers of the dielectric stack—although this part of the stack is indicated with reference numeral 330' on FIG. 11 as a reminder that it originated as part of the substrate.

Viewing particularly FIG. 11, it is seen that the one thick high-index sub-layer 330 of the stack 526' is the remaining portion of the substrate upon which the other sub-layers of the dielectric stack were grown. However, the thinned substrate portion 330' is still much thicker than the other sub-layers of the dielectric stack.

Ordinarily, this presents the problem of having the beam diffract to a large diameter before re-entering the fiber wave guide. The choice of silicon as the substrate material, though, largely circumvents this problem. The high index of refraction of the silicon material limits this spreading of the beam, and optimizes the transmission efficiency of light from one fiber to the other. Because of the thickness of the layer 330' of the stack 526', the fiber 624 receiving light from the fiber 50 via stack 526' needs to be offset slightly in the direction shown in FIG. 11 (i.e., downwardly as viewed in this drawing Figure). The remaining portion 330' of the substrate has sufficient mechanical strength to allow the dielectric stack to be handled like a plate (with due caution because it is a fine-dimension plate-like structure). This plate-like stack of dielectric sub-layers is indicated with numeral 526' in FIG. 11, and provides the necessary polarizing action between the aligned optical fibers held in the ferrules, which is easily understood in view of the above.

Further to the above, a polarizer embodying the present invention has been constructed and tested. This polarizer has 13 sub-layers (7 high-index sub-layers, and 6 low-index sub-layers, having thicknesses of 85 nanometers and 140 nanometers, respectively), which are respectively formed of silicon (index 3.75), and silica (index 1.49). This dielectric stack of sub-layers was formed on a face of a ferrule as depicted in FIG. 7; and interfaces between optical fibers each with a core index of 1.45. During testing, this polarizer provided an extinction of over 40 dB for light polarized orthogonally to the polarizer without excess loss of light at the preferred polarization. Preferably, loss of light at the preferred polarization should not excess 1 to 2 dB, and this was accomplished. The light used in this example had a wavelength of 1310 nm.

A second polarizer embodying the present invention was also constructed and tested. This polarizer has 11 sub-layers (6 high-index sub-layers, and 5 low-index sub-layers, having thicknesses of 124 nanometers and 239 nanometers, respectively). These sub-layers were also formed of silicon (index 3.75), and silica (index 1.49), respectively. As above, the dielectric stack of the polarizer interfaces between optical fibers each with a core index of 1.45. This polarizer has been tested with light in the wavelength band from about 1300 nm. to about 1550 nm., and has been found to provide favorably comparable polarizing extinction performance in this wavelength band.

In view of the above, it is seen that the present invention provides a fiber-optic acoustical sensor with decreased noise, and improved performance. Further, the present invention provides an all-fiber in-line polarizer which may advantageously be used in an acoustical sensor apparatus. Further, the present invention provides such an all-fiber in-line polarizer which may be used for polarizing light in a wavelength band with very good extinction of the unwanted polarizations.

While the present invention has been depicted, described, and is defined by reference to several particularly preferred embodiments of the invention, such reference does not imply a limitation on the invention, and no such limitation is to be inferred. The invention is capable of considerable modification, alteration, and equivalents in form and function, as will occur to those ordinarily skilled in the pertinent arts. The depicted and described preferred embodiments of the invention are exemplary only, and are not exhaustive of the scope of the invention. Consequently, the invention is intended to be limited only by the spirit and scope of the appended claims, giving full cognizance to equivalents in all respects.

We claim:

1. A method of operating a fiber-optic acoustical sensor, said method comprising steps of:

providing into one end of an elongate fiber-optic conductor a pair of orthogonally-polarized light beams;

providing a polarizer receiving said pair of orthogonally-polarized light beams from a second opposite end of said elongate fiber-optic conductor and responsively providing a polarized output light beam;

providing an optical acoustical transducer receiving said polarized output light beam and also receiving acoustical energy ambient to said transducer, and utilizing said optical acoustical transducer to responsively providing a modulated optical output light beam signal analogous to a characteristic of said acoustical energy;

further including the step of providing said pair of orthogonally-polarized light beams in the form of a train of time-interleaved pulses of light.

2. The method of claim 1 further including the step of providing said time-interleaved pulses of light with polarization states successively alternating between two orthogonal directions so that each pulse of light is orthogonally-polarized relative to each next-adjacent pulse of light.

3. A fiber-optic acoustical sensor comprising:

a light source providing a polarized light beam;

an elongate optical fiber at a proximal end receiving said light beam and having a distal end from which issues said light beam in an indeterminate state of polarization;

a polarizer receiving said light beam in an unknown state of polarization from said distal end of said optical fiber, and responsively providing light having substantially a stable state of polarization; and an optical acoustical transducer receiving said light having substantially a stable state of polarization from said polarizer and also receiving acoustical energy ambient to said transducer, said transducer responsively providing a phase modulated light beam signal analogous to a characteristic of said acoustical energy;

wherein said light source further includes means for providing two orthogonally polarized light beams into said proximal end of said elongate optical fiber;

wherein said means for providing said pair of orthogonally-polarized light beams further includes means for time-interleaving orthogonally polarized pulses of said pair of light beams.

4. The fiber-optic acoustical sensor of claim 3 wherein said means for time-interleaving orthogonally polarized pulses of said pair of light beams includes:

an optical switch dithering open and closed at a determined rate to provide timed pulses of said light beam;

a PM (polarization maintaining) three-port coupler receiving said timed pulses of said light beam and dividing each of said timed pulses into two light beam pulses of equal timing;

a pair of PM fiber optic conductors each connecting with a respective port of said three-port coupler and defining a bifurcated light-transmission path having two branches each providing a respective one of said orthogonally-polarized light beams, one of said pair of branches having means for effecting a time delay of light pulses passing along that branch with respect to the transit time of light passing along the other of said pair of branches, said time delay being of sufficient magnitude to time-interleave said light pulses, one of said pair of fiber optic conductors including a 90° rotated splice providing orthogonal polarization for said light pulses; and a coupler receiving said time-interleaved and orthogonally-polarized light pulses from said pair of fiber optic conductors, and connecting said light pulses with said elongate optical fiber.

5. The fiber-optic acoustical sensor of claim 3 wherein said means for time-interleaving orthogonally polarized pulses of said pair of light beams includes:

a three-port coupler receiving said polarized light beam and dividing said polarized light beam into a pair of polarized light beams;

a pair of PM (polarization maintaining) fiber optic conductors each connecting with a respective port of said three-port coupler and defining a bifurcated light-transmission path having two branches each providing a respective one of said orthogonally polarized light beams, a pair of optical switches each disposed in a respective branch of said branched light transmission path, said pair of optical switches switching open and closed in opposition to one another at a determined rate to provide time-interleaved pulses of said pair of polarized light beams; one of said pair of PM fiber optic conductors including a 90° rotated splice providing orthogonal polarization for said time-interleaved pulses of said pair of light beams; and a coupler receiving said orthogonally polarized and time-interleaved pair of light pulses from said pair of fiber optic conductors, and connecting said light pulses with said elongate optical fiber.

6. A fiber-optic acoustical sensor comprising:

a light source providing a polarized light beam;

an elongate optical fiber at a proximal end receiving said light beam and having a distal end;

a polarizer receiving said light beam in an unknown state of polarization from said distal end of said optical fiber, and responsively providing light having substantially a stable state of polarization;

said polarizer including a pair of optical fiber portions aligning along an optical axis, each one of said pair of optical fiber portions defining a respective one of a confronting pair of end surfaces angulated with respect to said optical axis at substantially a Brewster angle; a dielectric layer disposed between said pair of end surfaces, said dielectric layer including plural sub-layers including at least a pair of high-index sub-layers each adjacent to a respective one of said pair of end surfaces, and at least one low-index sub-layer disposed between said pair of high-index sub-layers, and each of said high-index and low-index sub-layers having a respective index of refraction determining said Brewster angle; and an optical acoustical transducer receiving said light having substantially a stable state of polarization from said polarizer and also receiving acoustical energy ambient to said transducer and responsively providing a modulated light beam signal analogous to a characteristic of said acoustical energy.

7. The fiber-optic acoustical sensor of claim 6 wherein said light source further includes means for providing two orthogonally-polarized and time-interleaved pulsed light beams into said proximal end of said elongate optical fiber.

8. The fiber-optic acoustical sensor of claim 6 wherein said means for providing orthogonally polarized and time-interleaved pulsed light beams includes:

an optical switch switching open and closed at a determined rate to provide timed pulses of said light beam;

a three-port PM (polarization maintaining) coupler receiving said timed pulses of said light beam and dividing each of said timed pulses into two light beam pulses of equal timing;

a pair of PM fiber optic conductors each connecting with a respective port of said three-port coupler and defining a bifurcated light-transmission path having two branches each providing a respective one of said orthogonally polarized light beams, one of said pair of branches having means for effecting a time delay of light pulses passing along said one branch with respect to the transit time of light passing along the other of said pair of branches, said time delay being of sufficient magnitude to time-interleave said light pulses, one of said pair of fiber optic conductors including a 90° rotated splice providing orthogonal polarization for said light pulses; and a PM coupler receiving said time-interleaved and orthogonally polarized light pulses from said pair of fiber optic conductors, and connecting said light pulses into said elongate optical fiber.

9. The fiber-optic acoustical sensor of claim 6 wherein said means for providing orthogonally polarized and time-interleaved pulses of said pair of light beams includes:

a polarizer polarizing said light beam to provide a polarized light beam;

a three-port PM (polarization maintaining) coupler receiving said polarized light beam and dividing said polarized light beam into a pair of polarized light beams;

a pair of PM fiber optic conductors each connecting with a respective port of said three-port coupler and defining a bifurcated light-transmission path having two branches each providing a respective one of said orthogonally polarized light beams, a pair of optical switches each disposed in a respective branch of said branched light transmission path, said pair of optical switches switching open and closed in opposition to one another at a determined rate to provide time-interleaved pulses of said pair of polarized light beams; one of said pair of fiber optic conductors including a 90° rotated splice providing orthogonal polarization for said time-interleaved pulses of said pair of light beams; and a PM coupler receiving said orthogonally polarized and time-interleaved pair of light pulses from said pair of fiber optic conductors, and connecting said light pulses with said elongate fiber-optic conductor.

10. The fiber-optic acoustical sensor of claim 6 wherein said light source further includes means for providing two orthogonally polarized continuous-wave light beams into said proximal end of said elongate optical fiber.

11. The fiber-optic acoustical sensor of claim 10 wherein said means for providing said pair of orthogonally-polarized continuous-wave light beams includes:

a pair of light sources each providing a respective one of a pair of polarized light beams;

means for phase modulating each one of said pair of light beams each at a respective phase modulation frequency differing from the other; and means for relatively rotating the polarization direction of said pair of light beams to provide a pair of orthogonally-polarized light beams.

12. The fiber-optic acoustical sensor of claim 11 wherein said sensor has a detection band width, and said means for phase modulating said pair of light beams includes means for imposing a respective frequency modulation on each one of said pair of light beams, said respective frequency modulation frequencies of said pair of light beams differing from one another by a frequency difference which is greater than said detection band width.

13. The polarizer of claim 6 wherein said index of refraction of said at least one low-index sub-layer substantially matches the index of refraction of a core part of said pair of optical fiber portions.

14. The polarizer of claim 6 wherein said index of refraction of said at least one low-index sub-layer differs from the index of refraction of a core part of said pair of optical fiber portions.

15. The polarizer of claim 6 in which said Brewster angle is determined according to the relationship: $\Theta_B = \arctan n_H/n_L$, in which $n_H$ and $n_L$ respectively are the index of refraction of said at least a pair of high-index sub-layers and of said at least one low-index sub-layer.

16. The polarizer of claim 6 in which said at least a pair of high-index sub-layers are each formed of silicon.

17. The polarizer of claim 6 in which said at least one low-index sub-layer is formed of silica.

18. The polarizer of claim 6 further including a pair of ferrules each holding a respective one of said pair of optical fiber portions.

* * * * *